(12) United States Patent
Sauerbier (10) Patent No.: US 7,625,153 B2
(45) Date of Patent: Dec. 1, 2009

(54) FLOATING OCEANIC SURFING REEF

(76) Inventor: Charles E. Sauerbier, 670 Del Sol, Arroyo Grande, CA (US) 93420

( * ) Notice: Subject to any disclaimer, the term of this patent is extended or adjusted under 35 U.S.C. 154(b) by 290 days.

(21) Appl. No.: 11/353,779

(22) Filed: Feb. 14, 2006

(65) Prior Publication Data

US 2007/0186338 A1   Aug. 16, 2007

(51) Int. Cl.
*A63B 69/00* (2006.01)
(52) U.S. Cl. ........................................ 405/79
(58) Field of Classification Search ............... 405/76, 405/79; 472/128, 88; 4/491
See application file for complete search history.

(56) References Cited

U.S. PATENT DOCUMENTS

| 2,983,508 | A | * | 5/1961 | Modine | 472/128 |
| 4,507,018 | A | * | 3/1985 | Andersen | 405/79 |
| 4,792,260 | A | * | 12/1988 | Sauerbier | 405/79 |
| 4,954,014 | A | * | 9/1990 | Sauerbier et al. | 405/79 |
| 5,000,110 | A | * | 3/1991 | Moore | 114/245 |
| 5,171,101 | A | * | 12/1992 | Sauerbier et al. | 405/79 |
| 5,628,584 | A | * | 5/1997 | Lochtefeld | 405/79 |
| 5,664,910 | A | * | 9/1997 | Lochtefeld et al. | 405/79 |
| 5,860,766 | A | * | 1/1999 | Lochtefeld et al. | 405/79 |
| 5,899,633 | A | * | 5/1999 | Lochtefeld | 405/79 |
| 5,899,634 | A | * | 5/1999 | Lochtefeld | 405/79 |
| 5,911,190 | A | * | 6/1999 | Lochtefeld et al. | 114/274 |
| 5,913,636 | A | * | 6/1999 | Macaulay | 405/79 |
| 6,928,670 | B2 | * | 8/2005 | Lochtefeld et al. | 4/491 |
| RE39,171 | E | * | 7/2006 | Lochtefeld | 405/79 |
| 7,144,285 | B1 | * | 12/2006 | Hendricks | 441/74 |
| 7,252,047 | B1 | * | 8/2007 | Baucom, Jr. | 114/284 |
| 2005/0286976 | A1 | * | 12/2005 | Lochtefeld et al. | 405/79 |
| 2006/0254487 | A1 | * | 11/2006 | Cobb et al. | 114/61.1 |

FOREIGN PATENT DOCUMENTS

| FR | 2702965 | A1 | * | 9/1994 |
| JP | 60181410 | A | * | 9/1985 |
| WO | WO 9006790 | A1 | * | 6/1990 |

* cited by examiner

*Primary Examiner*—Sunil Singh
(74) *Attorney, Agent, or Firm*—Richard D. Clarke (57) ABSTRACT

The present invention involves an apparatus, namely a reef, used to transform ocean wave energy into preferred surfing waves. The reef is comprised of a hull having a substantially flat top surface with a vertically convex shape that preferably creates about a seventy degree tangential bow angle with the ocean surface. The bottom portion is tri-hull shaped and includes two side hulls and a center hull. The preferred embodiment is connected to a master vessel by control arms. The control arms can control the depth of the reef in water, thus controlling the wave characteristics. The control arms can also provide a ducting means for ballast pumps on the master vessel. In an alternative embodiment, the reef can be self-supporting in water. A single reef or a multiple reef configuration can be placed near shore to help prevent beach erosion by wave action, and or cause beach sand to accumulate. Several reefs can be connected for longer-lasting waves.

20 Claims, 8 Drawing Sheets

FLOATING OCEANIC SURFING REEF

BACKGROUND OF THE INVENTION

1. Field of the Invention

The present invention generally relates to the field of surfing reefs. More specifically, the preferred embodiment of the present invention involves a floating reef system adapted to float on or near the surface of an ocean to capture the energy of deep water swells and surface waves and transform the energy into preferred surfing waves.

2. Description of the Related Art

The sport of surfing has attracted enthusiasts all over the world. Many of them travel long distances to locations where ideal surfing conditions exist. Particularly prized by expert surfers are the waves called "the chute" or "the pipeline", that is, waves which move with sufficient velocity and height that, when they encounter an upwardly sloping bottom of certain configuration, curl forward over the advancing base of the wave to form a tunnel, inside or at the mouth of which expert surfers move laterally across the face of the wave, seeking to keep pace with the formation of the tunnel without being caught in the collapsing portion thereof.

The formation of such waves under natural conditions requires a comparatively rare combination of factors, including wind of a certain constancy of velocity and direction, and waves of a certain velocity, direction and height, approaching a shore having a certain bottom slope and configuration. There are not many places in the world with such a favorable combination of characteristics. Surfers generally must travel several hundred to several thousand miles to reach such locations where the optimum conditions can exist. Because there are few places where succeeding waves can be counted upon to be uniform for extended periods, the places that do offer such waves are often overcrowded. When crowded conditions exist, instead of focusing entirely on riding a wave, surfers must also try to avoid encountering and injuring other surfers, which can dampen the quality of the surfing experience.

Since the 1970's, wave pools have been built to combat the problem of non-ideal wave conditions that exist in many areas of the world, and hence alleviate the overcrowded locations where optimum surfing conditions exist. Typically, a wave pool is a modified pool for swimmers without detailed design for surfing, but the waves produced are meant to peel, rather than close out. However, surfers have had mixed reaction to the existing pools, and most have rejected them due to poor surfing wave quality. Generally, wave pools have been disfavored due to the inadequately designed shape of the pool, which controls wave height in the pool, and the poor bottom, shape, which acts as the reef for the wave to break on. Additionally, to make waves break for surfing, the bottom of the wave pool must be similar to ocean surfing reefs. However, the space available for the wave conditioning prior to the breaking of the waves is not available in wave pools. Therefore, although advances have been made in wave pool design, the characteristics of waves produced in wave pools have yet to match the ideal quality waves desired by surfers around the world. Thus, there still exists a demand for technology that can produce waves with ideal characteristics while simultaneously providing a realistic surfing environment that is not overcrowded.

Man-made oceanic reefs have also been used to try and solve the problem of non-ideal wave conditions at various locations. However, the production of a man-made reef can require substantial amounts of time and labor, resulting in significant costs. Similarly, the creation of a man-made reef also requires careful government monitoring and approval, which can also contribute to a delay in completion. In a like manner, obtaining the land rights to create such a reef can involve much effort as well as cost, and could face delay from court challenges by conservation and environmental groups. Lastly, even if such a man-made reef were feasible, the time, effort, and costs associated would likely limit the creation of such reefs to locations that contain the resources to build the reef. While a possibility, this solution does not present an adequate means for allowing surfing and other recreational activities in various locations worldwide.

Another problem closely associated with waves and wave action is the problem of beach erosion. In many locations throughout the world, wave action can cause beach material (sand, soil, pebbles, rocks, etc.) to wash away into the ocean at a significant rate. Various efforts have been made to combat the problem of beach and reef erosion. However, these efforts have been time consuming, costly, and not produced adequate results. Thus, a demand exists for technology that can be utilized to help prevent beach and reef erosion.

Therefore, it would be highly desirable to provide a relatively compact, mobile, and controllable free-floating apparatus that can capture and transform the energy of natural ocean swells, creating optimum wave conditions in any location for a variety of surf activities, including surfing, and can also be placed in proximity to an existing beach to help prevent erosion of the beach.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF THE INVENTION

The principle advantage of this invention is to provide a device that can be used to capture the energy of deep water swells and surface waves and transform the energy into preferred surfing waves.

Another advantage of this invention is to provide a device for transforming ocean wave energy into preferred surfing waves that can be readily transported to various locations.

Another advantage of this invention is to provide a device for transforming ocean wave energy into preferred surfing waves that is relatively compact.

And still another advantage of this invention is to provide a device for transforming ocean wave energy into preferred surfing waves that can be self-supported in water.

And yet a further advantage of this invention is to provide a device for transforming ocean wave energy into preferred surfing waves that can be placed in proximity of an existing beach to protect against erosion of the beach by wave action.

And yet another advantage of this invention is to provide a device for transforming ocean wave energy into preferred surfing waves that, because of its mobility, does not present the problem of having to forecast the complex long-term consequences of a fixed man-made ocean reef, but rather presents the opportunity to adjust and keep focused the effects of the device's placement relative to the constantly changing patterns of multiple ocean waves.

And still a further advantage of this invention is to add a new and unique device to the field of surfing reefs.

These advantages, and other advantages of the invention, will be apparent to those of ordinary skill in the art from the disclosure of the present invention as set forth herein.

The present invention involves an apparatus, namely a reef, used to transform ocean wave energy into preferred surfing waves. The reef is comprised of a hull having a substantially flat top surface with a vertically convex shape that preferably creates about a seventy degree tangential bow angle with the ocean surface. The bottom portion is tri-hull shaped and includes two side hulls and a center hull. The preferred embodiment is connected to a master vessel by control arms. The control arms can control the depth of the reef in water, thus controlling the wave characteristics. The control arms can also provide a ducting means for ballast pumps on the master vessel. In an alternative embodiment, the reef can be self-supporting in water. The reef can be placed near a beach or natural reef to prevent erosion by wave action. Several reefs can be connected for longer-lasting waves.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the principals of this invention.

DETAILED DESCRIPTION OF THE PREFERRED EMBODIMENTS

Figure 1:
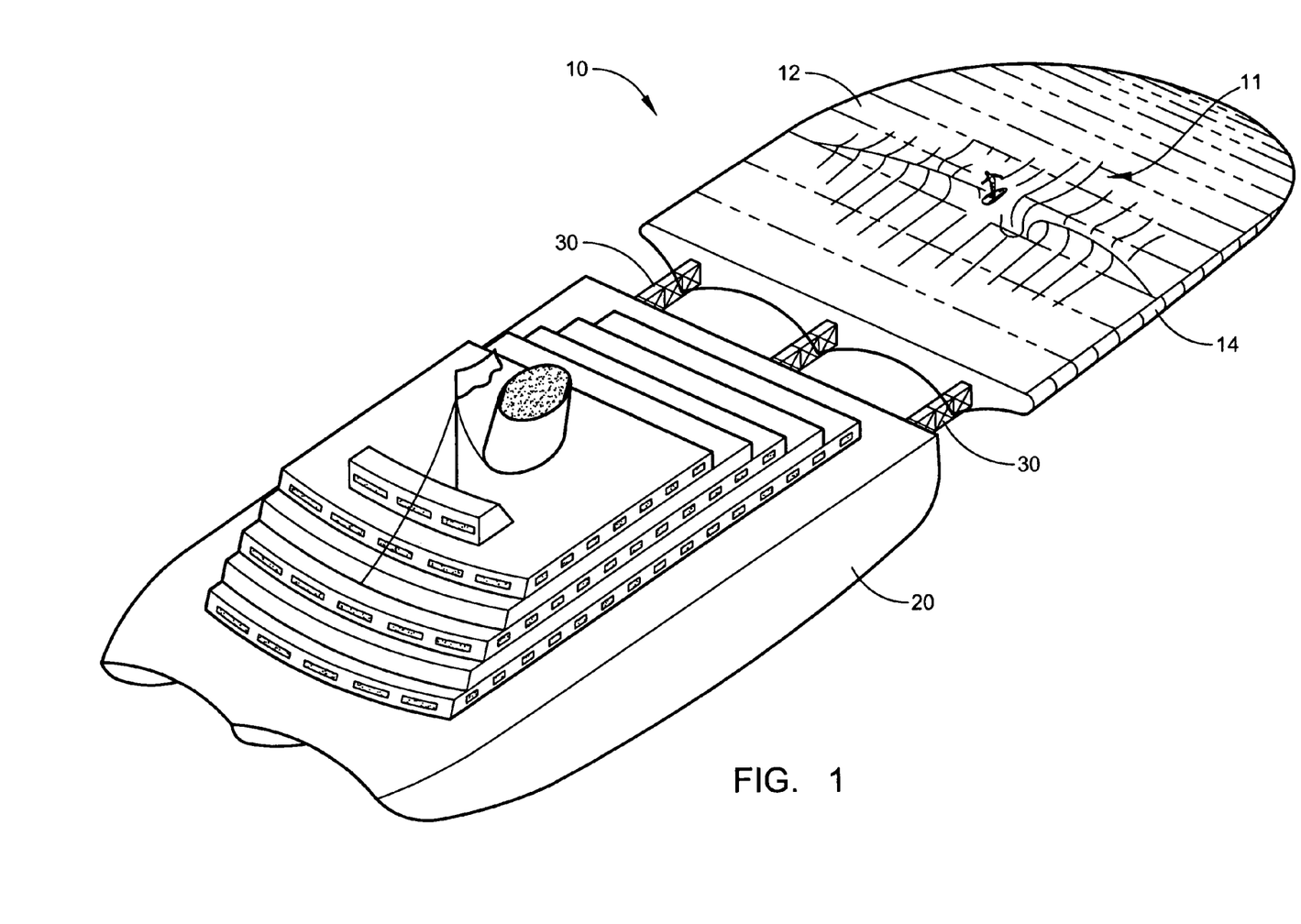
FIG. 1 depicts a perspective view of the floating oceanic surfing reef attached to a master vessel, constructed in accordance with the present invention.

Referring now to the drawings, wherein similar parts are identified by like reference numerals, there is seen in FIG. 1 a perspective view of the floating oceanic surfing reef 10 attached to a master vessel 20 by control arms 30. The optimum dimensions of floating oceanic surfing reef 10 to produce waves with desirable characteristics are 480 feet in length and 360 feet in width. At these dimensions, floating oceanic surfing reef 10 can transform free ocean wave energy into waves 11 with 20 foot faces and 15 second periods. It is to be understood that the dimensions of floating oceanic surfing reef 10 can be varied to produce waves with certain specific characteristics, such as favoring either a right or left shoulder, as would be recognized by one with ordinary skill in the art. These dimensions can range upward from 125 feet in length and 100 feet in width, as long as the length is approximately 25% larger than the size of the width. Floating oceanic surfing reef 10 is preferably constructed of a steel or aluminum, but can be comprised of other lightweight and strong materials, such as a carbon fiber epoxy composite, and other materials as recognized by one with ordinary skill in the art. Floating oceanic surfing reef 10 has a top surface 12 and a bottom portion 14. Top surface 12 is comprised preferably flat, but can contain surface variations to focus and optimize smaller wave energy and assist in producing waves that contain specific characteristics for a variety of recreational activities including but not limited to surfing, body boarding, and swimming. Top surface 12 is preferably comprised of rubber with an elastomer coating for safety and comfort reasons.

Top surface 12 employs the phenomenon of wave defraction and refraction to focus smaller wave energy. The focusing of smaller wave energy is done by changing the substantially flat top surface 12 with incompressible water filled bladders (not shown) via a ducting manifold that can be controlled within control arms 30. These bladders can preferably be comprised of a high tension rubber material. When filled, the bladders create a physical obstruction to the wave energy as it propagates over the top surface 12. Refraction occurs bending the wave energy to advantage. This, coupled along with defractive lateral propagation wave energy from the edges of reef 10 can help create waves that momentarily are higher than the adjacent waves.

Master vessel 20 can be any type of floating vessel capable of towing a large object, ranging from small yachts to cruise ships. Floating oceanic surfing reef 10 is attached to master vessel 20 by control arms 30. Control arms 30 are rigid structures that help control floating oceanic surfing reef 10. In the preferred embodiment, floating oceanic surfing reef 10 is attached to master vessel 20 by three control arms 30. However, it is within the scope of the present invention for floating oceanic surfing reef 10 to be attached to master vessel 20 by one or several control arms 30. When control arms 30 are in a locked position, floating oceanic surfing reef 10 and master vessel 20 are engaged in a substantially fixed orientation. Control arms 30 can be adjusted to control the depth and positioning of floating oceanic surfing reef 10 within the ocean, thereby varying the character of the waves breaking over floating oceanic surfing reef 10.

Control arms 30 also can provide a means of ducting for ballast pumps (not shown) on master vessel 20, which further control the positioning and depth of floating oceanic surfing reef 10 in ocean water. Control arms 30 can also serve as a conduit for electrical or air lines that facilitate the process of controlling the positioning and depth of floating oceanic surfing reef 10 in ocean water.

Figure 2:
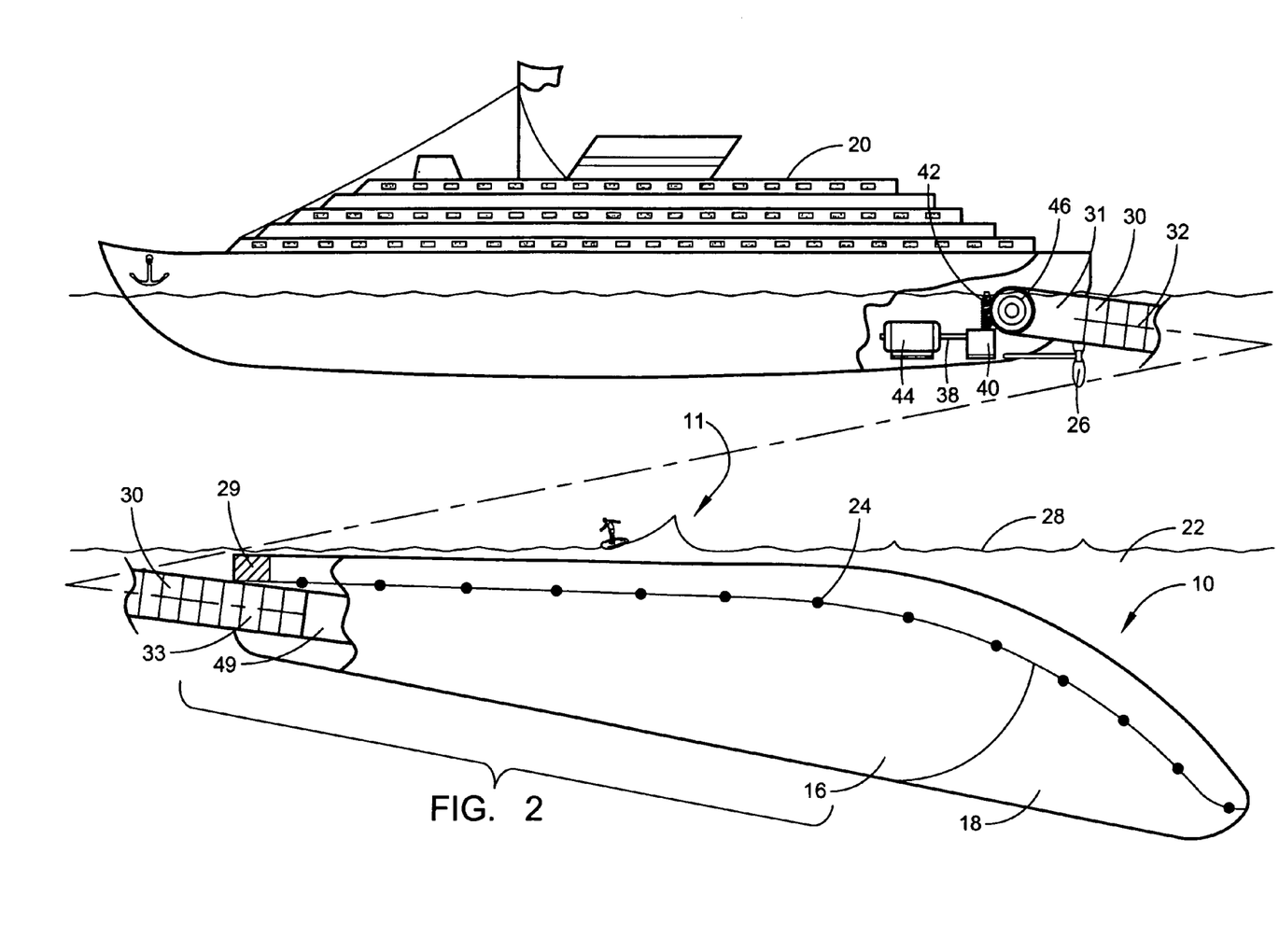
FIG. 2 depicts a side view of the floating oceanic surfing reef attached to a master vessel by a control arm, situated within water, constructed in accordance with the present invention.

As illustrated in FIG. 2, there is seen a side view of floating oceanic surfing reef 10 attached to master vessel 20, within water 22. Floating oceanic surfing reef 10 is attached to master vessel 20 via control arms 30 (only one shown). Floating oceanic surfing reef 10, while inherently possessing buoyant characteristics, can be submerged in water 22 to a desired depth. Control arms 30 preferably allow the hydraulic pivotal adjustment of floating oceanic surfing reef 10 to attain the desired depth positioning in water 22. Bottom portion 14 is comprised of side hulls 16 (only one shown) and center hull 18. Side hulls 16 extend in a downward and inward curvilinear fashion from top surface 12 to center hull 18.

When floating oceanic surfing reef 10 is desired to be transported by master vessel 20, side hulls 16 and center hull 18 are unballasted so that floating oceanic surfing reef 10 will float. Before floating oceanic surfing reef 10 can be used to generate waves 11, side hulls 16 and center hull 18 must be ballasted to lower floating oceanic surfing reef 10 into the water to the desired depth. Although control arms 30 can aid in positioning floating oceanic surfing reef 30 to a desired depth, additional depth positioning procedures, such as ballasting are needed to provide maximum depth adjustment capabilities. Additionally, floating oceanic surfing reef 10 contains several buoys 24 attached to the perimeter of top surface 12 for the purpose of providing attachment means for protective netting against sharks, etc.

Also seen in FIG. 2 is the preferred method for controlling the depth positioning of floating oceanic surfing reef 10. Control arm 30 is preferably comprised of a horizontal shaft 32 with master vessel end 31 and reef end 33. At master vessel end 31, at least two support plates 36 are welded or otherwise attached to master vessel end 31 for attachment of control arm 30 to master vessel 20. To adjust positioning of control arm 30, a drive shaft 38 is connected to a bevel gear 40 that turns a screw drive 42. Drive shaft 38 can be controlled by a control motor 44 contained within master vessel 20. Screw drive 42 is used to rotate a gear 46 that is attached to an axle 48 (see FIG. 3A), thereby altering the positioning of floating oceanic surfing reef 10. Reef end 33 is preferably rigidly attached to a rigid structure 49 within floating oceanic surfing reef 10 by welding or some other method to prevent movement of control arm 30 in relation to floating oceanic surfing reef 10. In other embodiments, hydraulics or pneumatics contained within master vessel 20 or control arm 30 can be used to adjust the depth positioning of floating oceanic surfing reef 10.

A wave dissipater 29 can also be contained within floating oceanic surfing reef 10. Wave dissipater 29 is used to help prevent waves from crashing into the back of master vessel 20. Wave dissipater 29 preferably is comprised of a slotted hollow cavity where water passing over floating oceanic reef 10 can enter into and be slightly or substantially dissipated, depending on the size dimensions of wave dissipater 29, helping to lessen the wave force encountering master vessel 20.

Figures 3A, 3B:
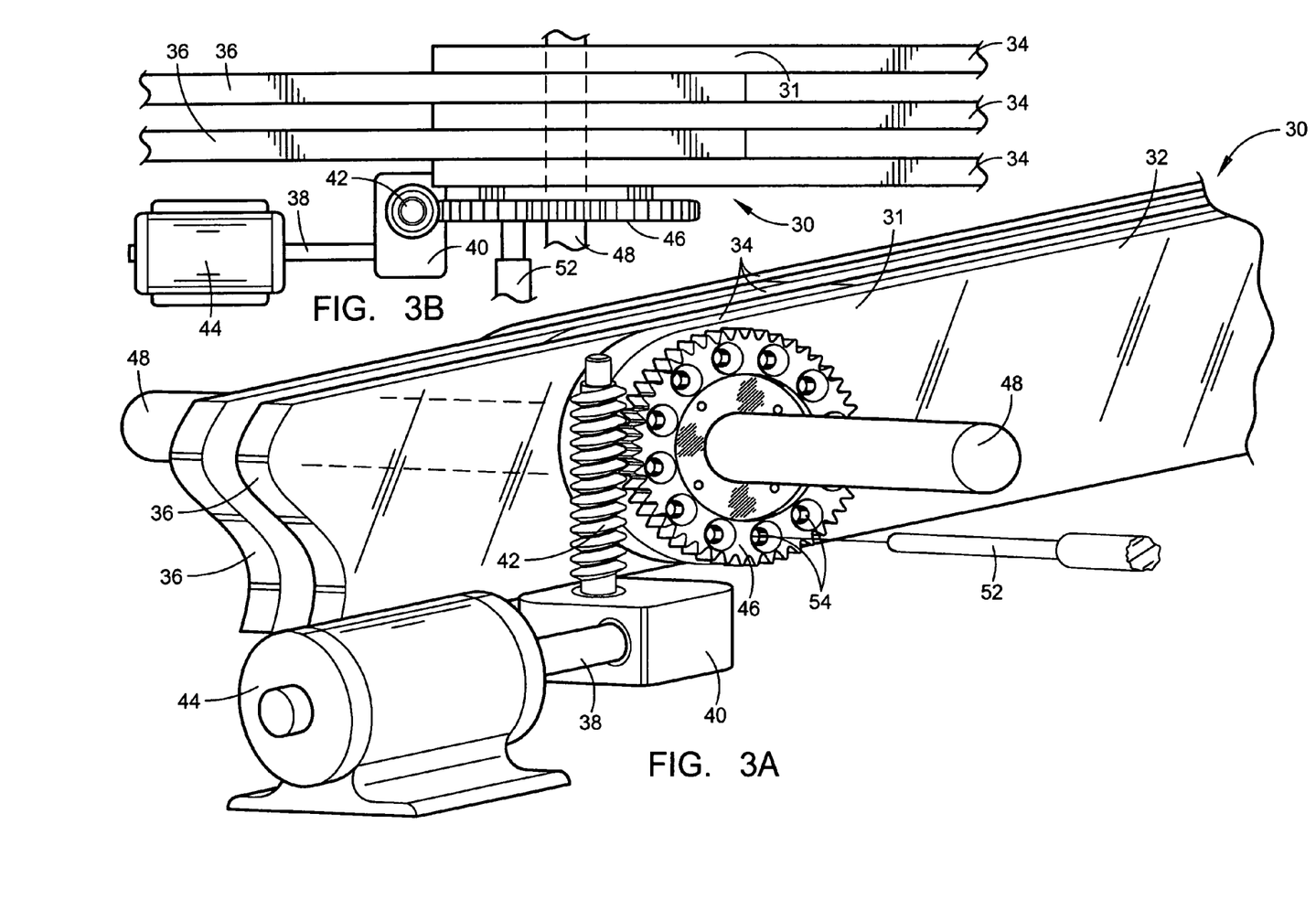
FIG. 3A depicts a perspective view of one end of the preferred embodiment of a control arm unattached to either floating oceanic surfing reef or a master vessel, constructed in accordance with the present invention.
FIG. 3B depicts a top view of the end portion of a control arm for connection to a master vessel, constructed in accordance with the present invention.

As illustrated in FIG. 3A there is seen a perspective view of one end 31 of the preferred embodiment of control arm 30 unattached to floating oceanic surfing reef 10. Depicted in the figure is the portion of control arm 30, namely master vessel end 31, for attachment to master vessel 20. Master vessel end 31 is preferably comprised of several rounded leaf-like portions 34. At least two support plates 36 are welded or otherwise attached to master vessel 20 for attachment of control arm 30 to master vessel 20. As discussed above, to adjust positioning of control arm 30, a drive shaft 38 is connected to a bevel gear 40 that turns a screw drive 42. Drive shaft 38 can be controlled by a control motor 44 contained within master vessel 20. Screw drive 42 is used to rotate a gear 46 that is attached to an axle 48, thereby altering the positioning of floating oceanic surfing reef 10. A hydraulic ram (not shown) is preferably used to drive a stopping pin 52 through holes 54 in gear 46 to prevent the rotation of gear 46 when the proper positioning of floating oceanic surfing reef 10 has been set. Alternatively, a hydraulic ram can be used to compress at least one set of brake calipers (not shown) attached to master vessel end 31 to prevent rotation of gear 46.

As illustrated in FIG. 3B there is shown a top view of master vessel end 31 of control arm 30 for connection to master vessel 20. Master vessel end 31 is comprised of preferably three leaf-like portions 34. However, it is to be recognized that master vessel end 31 can also contain two leaf-like portions 34 or more than three leaf-like portions 34. Leaf-like portions 34 are designed so that support plates 36 can interweave within leaf-like portions 34, thereby providing for both secure attachment and rotational ability of control arm 30.

Figure 4:
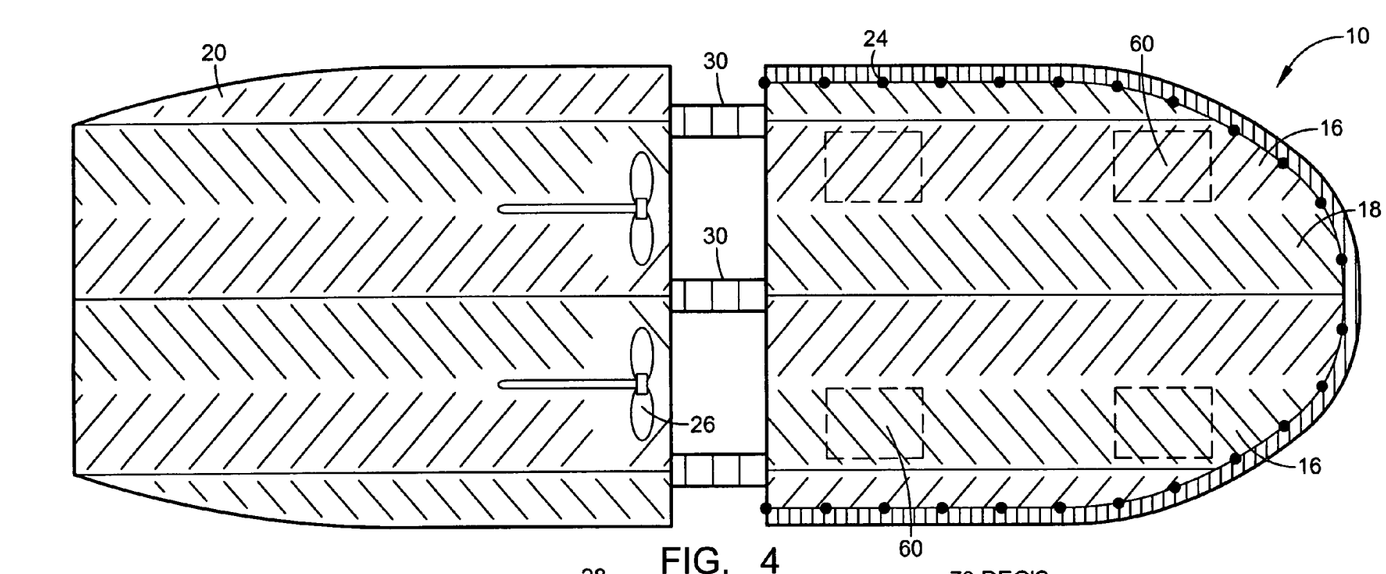
FIG. 4 depicts a bottom view of the floating oceanic surfing reef attached to a master vessel by three control arms, illustrating the tri-hull configuration of floating oceanic surfing reef, constructed in accordance with the present invention.

As illustrated in FIG. 4, there is seen a bottom view of floating oceanic surfing reef 10 attached to master vessel 20 by control arms 30, illustrating the tri-hull configuration of floating oceanic surfing reef 10, particularly the location of side hulls 16 and center hull 18. Master vessel 20 may contain one or more propellers 26 to aid in towing floating oceanic surfing reef 10. Control arms 30 are preferably attached to master vessel 20 away from propellers 26. Control arms 30 are preferably comprised of a strong, but flexible, corrosion-resistant material. Also depicted in the figure are the positioning of wave dampers 60 contained within an alternative embodiment of floating oceanic surfing reef 10 (see FIG. 5A).

Figures 5A, 5B:
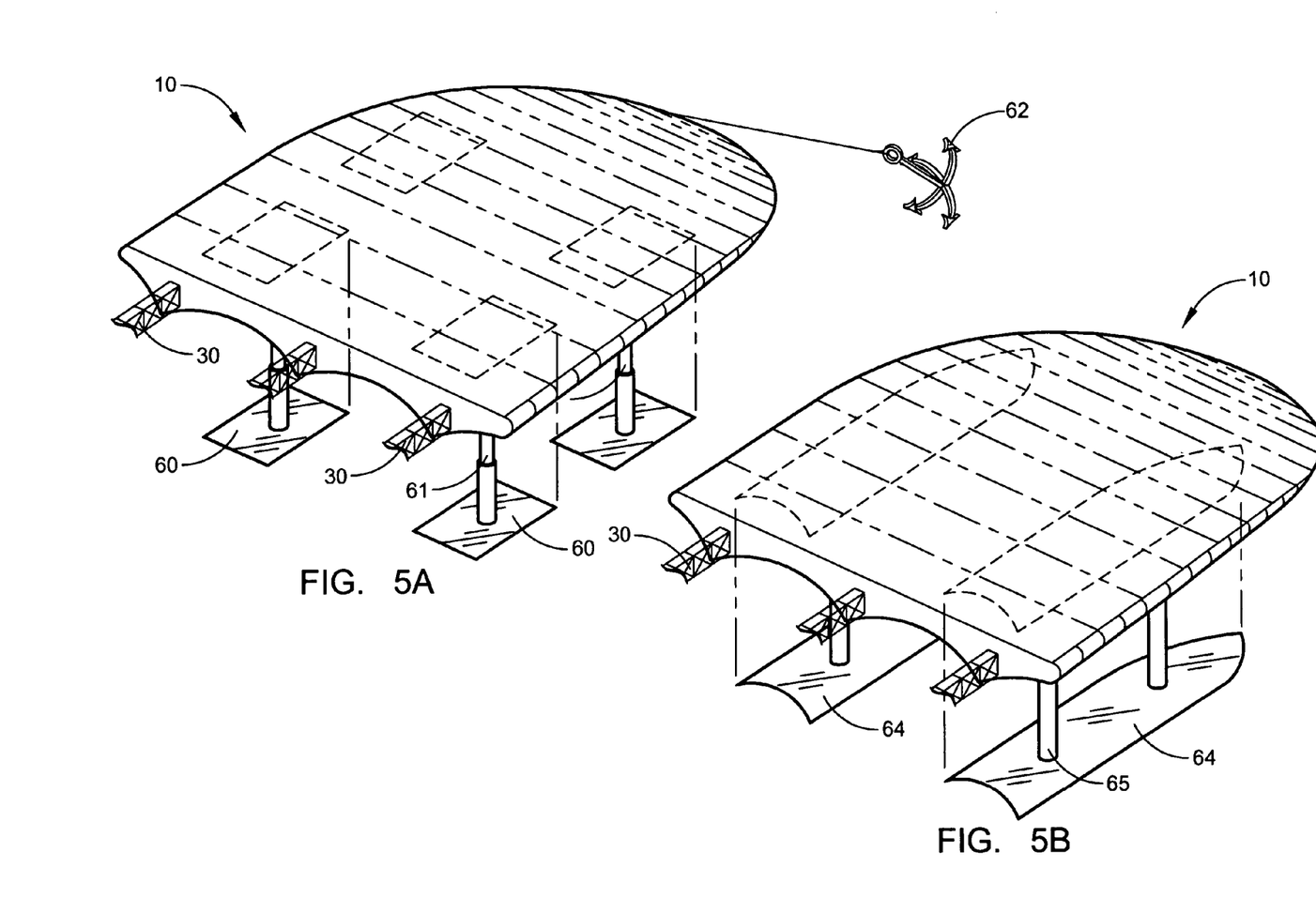
FIG. 5A depicts a perspective view of an alternate embodiment of the floating oceanic surfing reef containing four retractable wave dampening means, constructed in accordance with the present invention.
FIG. 5B depicts a perspective view of an alternate embodiment of the floating oceanic surfing reef containing two retractable wave dampening means, constructed in accordance with the present invention.

As illustrated in FIG. 5A, there is seen a perspective view of an alternate embodiment of floating oceanic surfing reef 10. This embodiment of floating oceanic surfing reef 10 preferably includes at least four wave dampers 60 retractably contained within floating oceanic surfing reef 10. When floating oceanic surfing reef 10 is being towed to sea, wave dampers 60 are retracted into floating oceanic surfing reef 10. However, when floating oceanic surfing reef 10 is positioned within the water, wave dampers 60 can be lowered into the ocean to help provide stability. Wave dampers 60 are all preferably lowered to the same depth in the ocean. However, to produce waves that break from different directions or with different characteristics, some wave dampers 60 can be lowered to different levels by retractable members 61, or not lowered at all. Additionally, floating oceanic surfing reef 10 can include a sea anchor 62 to prevent the floating oceanic surfing reef 10 from straying from the intended relative position within the ocean.

As illustrated in FIG. 5B, there is seen a perspective view of an alternate embodiment of floating oceanic surfing reef 10 that can be self-supported in water. This embodiment of floating oceanic surfing reef 10 preferably includes two elongated wave dampers 64 retractably contained by retractable members 65 within floating oceanic surfing reef 10. In this embodiment, both wave dampers 64 can be lowered at different levels or not lowered at all to produce varying waves. A sea anchor 62 can also be attached to the floating oceanic surfing reef 10 containing only two wave dampers 64.

Figure 6:
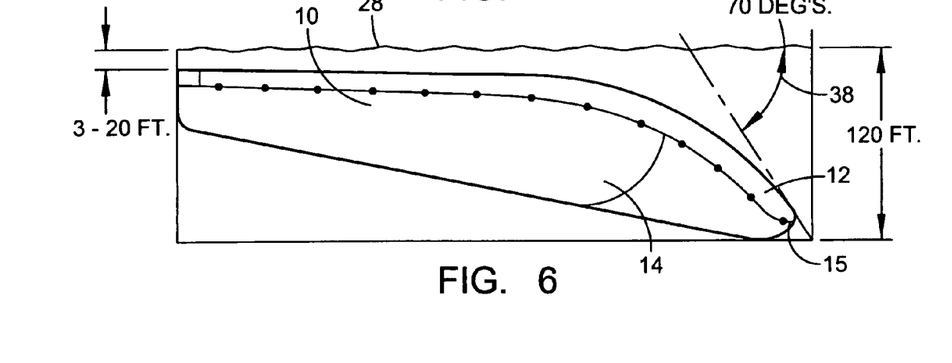
FIG. 6 depicts a side view of the preferred depth and angular positioning of the floating oceanic surfing reef in relation to the ocean surface, constructed in accordance with the present invention.

As illustrated in FIG. 6, there is seen a side view of the preferred depth and angular positioning of floating oceanic surfing reef 10 in relation to the ocean surface 28. In the preferred embodiment, to produce waves with ideal characteristics top surface 12 is positioned between 3 and 20 feet below ocean surface 28 with the outer-most forward edge 15 of bottom portion 14 positioned at a depth of approximately 120 feet below ocean surface 28. This positioning of floating oceanic surfing reef 10 creates a bow angle to tangent 38 at outer-most forward edge 15 with ocean surface 28 that is preferably about 70 degrees. Bow angle to tangent 38 can be varied to a larger or smaller angle, ranging from about 40 degrees to 80 degrees to produce waves with certain specific characteristics, as would be recognized by one with ordinary skill in the art.

Figures 7, 8:
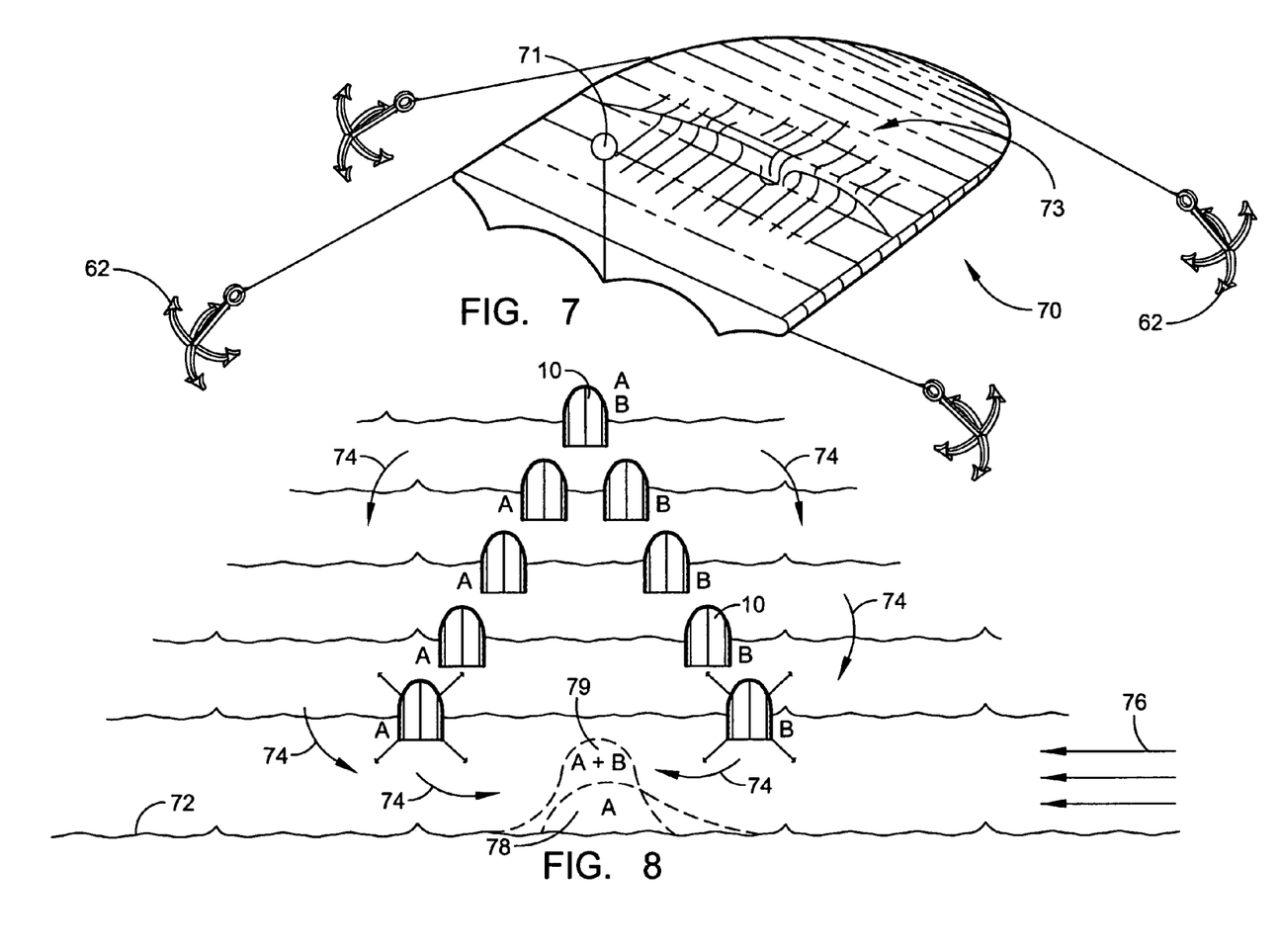
FIG. 7 depicts a perspective view of an alternate embodiment of the floating oceanic surfing reef containing means for freestanding capabilities within the ocean, constructed in accordance with the present invention.
FIG. 8 depicts a perspective view of several floating oceanic surfing reefs positioned in close proximity to or adjacent to a beach shoreline or natural reef for recreational use or the purpose of preventing erosion of the beach material or natural reef, constructed in accordance with the present invention.

As illustrated in FIG. 7, there is seen a perspective view of an alternate embodiment of floating oceanic surfing reef 70. Floating oceanic surfing reef 70 is freestanding and does not need the support of a towing vessel. Thus, floating oceanic surfing reef 70 can be towed to a location, positioned, and left to help create ideal surfable waves 73 or protect beaches or natural reefs from incoming waves (see FIG. 8). Also shown in the figure is a light 71. Light 71 is used to help notify other crafts of the location of floating oceanic surfing reef 70. One or more sea anchors 62 can be attached to floating oceanic surfing reef 70 for maintaining location within the ocean.

As illustrated in FIG. 8, there is seen a perspective view of several floating oceanic surfing reefs 10 in a fixed positioned in close proximity to or adjacent to a beach shoreline 72 for recreational use or the purpose of preventing erosion of the beach material. The impact of the wave energy shown by arrows 74 coming into the beach will be partially absorbed and deflected by the floating oceanic surfing reefs 10, thereby preventing damage to the beachfront. The positioning of several floating oceanic surfing reefs 10 into array "A" as shown in the figure allows natural current drift shown by arrows 76 to build up an accumulation of beach sand in the pattern as shown by mound 78. The positioning of several floating oceanic surfing reefs 10 into array "A+B" as shown in the figure allows natural current drift shown by arrows 76 to build up an accumulation of beach sand in the pattern as shown by mound 79. Thus, depending on the number of and positioning of floating oceanic surfing reefs 10, it is possible to gradually build up sand around a particular shoreline area.

Figure 9:
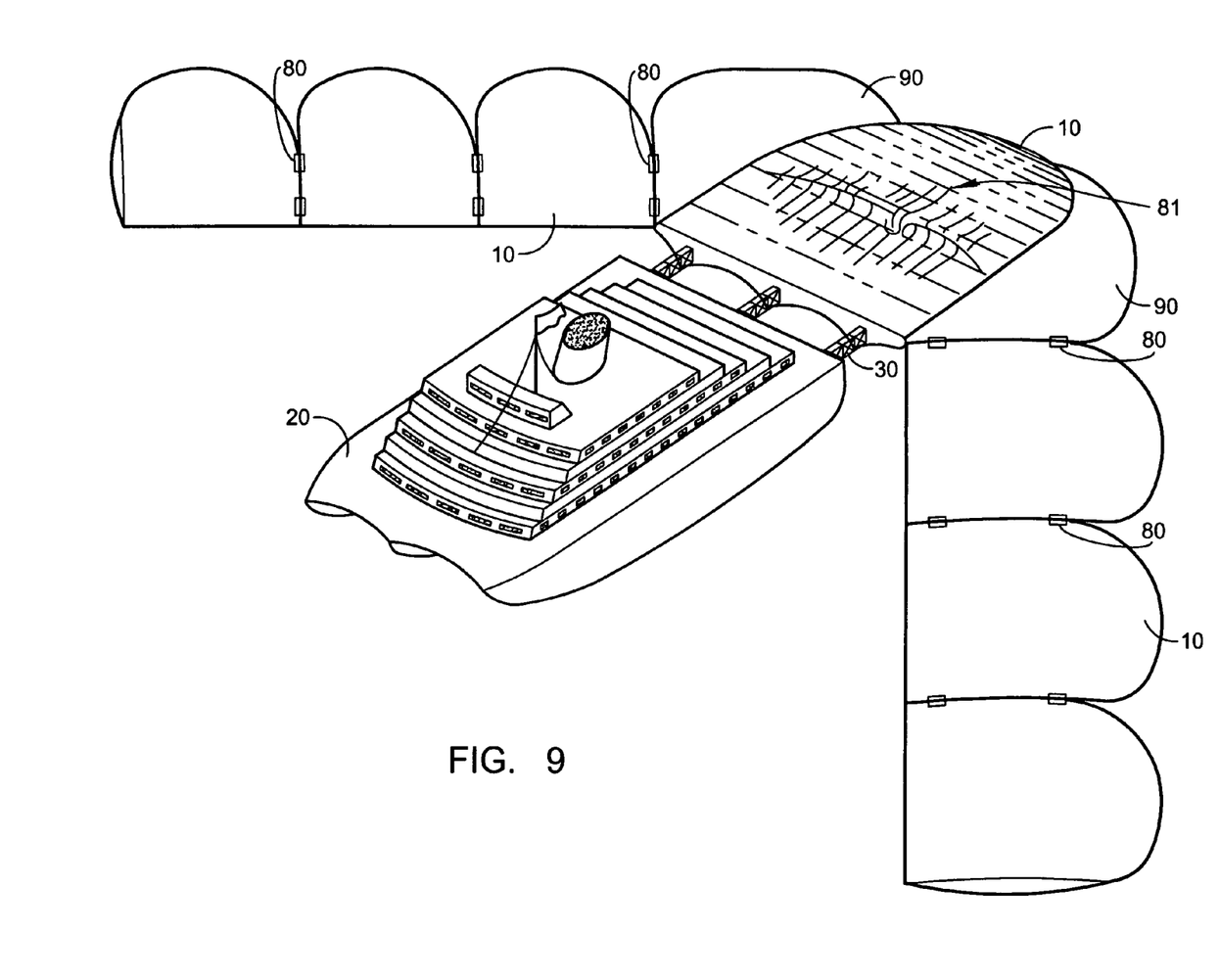
FIG. 9 depicts a perspective view of an combination of several floating oceanic surfing reefs to allow for waves to break for a longer period of time and a farther distance, constructed in accordance with the present invention.

As illustrated in FIG. 9, there is seen a perspective view of a combination of several floating oceanic surfing reefs 10 to allow for waves 81 to break for a longer period of time and a farther distance, thus allowing more surfers to surf the waves. Coupling members 80 are used to connect two floating oceanic surfing reefs 10. Coupling members 80 are preferably comprised of high strength rubber that allow for movement of the reefs 10. In this arrangement, the additional floating oceanic surfing reefs 10 do not need to be attached to a master vessel 20, however it is possible that more than one master vessel 20 can be used to help support the combination. Because numerous floating oceanic surfing reefs 10 can be possible connected to the floating oceanic surfing reef 10 attached to a master vessel 20, the additional reefs are preferably somewhat smaller in dimension than the attached floating oceanic surfing reef 10. Transitional reefs 90 can be connected to the floating oceanic surfing reef 10 to help set other floating oceanic surfing reefs 10 off at a 45 degree angle to the floating oceanic surfing reef 10 that is attached to master vessel 20 and serves as the base reef for other floating oceanic surfing reefs 10 to attach. Transitional reefs 90 can be of varying shapes depending on the particular angle that is chosen to offset the additional reefs from the attached reef.

Figure 10:
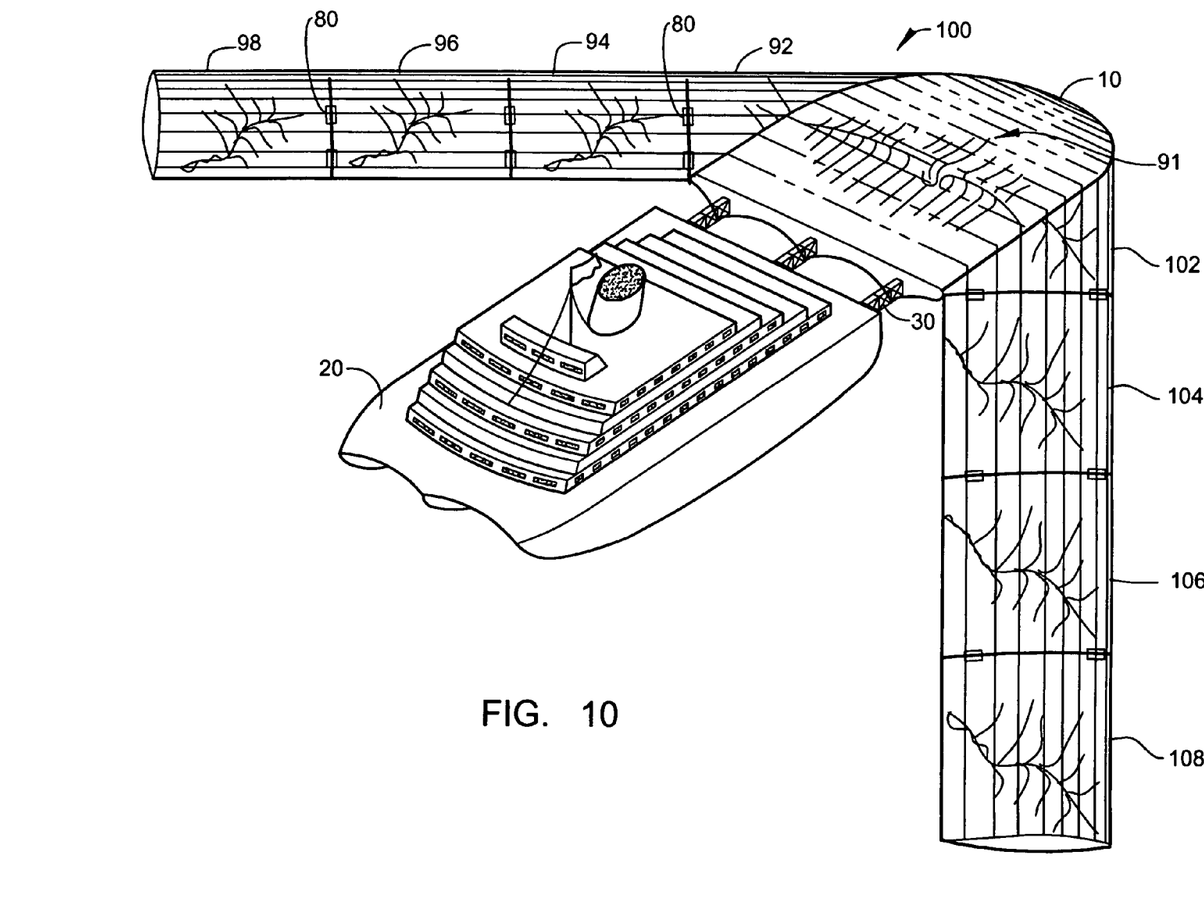
FIG. 10 depicts a perspective view of an alternate configuration of several floating oceanic surfing reefs to allow for waves to break for a longer period of time and a farther distance, constructed in accordance with the present invention.

As illustrated in FIG. 10, there is seen a perspective view of an alternate configuration of several connected floating oceanic surfing reefs 100 to allow for waves 91 to break for a longer period of time and a farther distance, thus allowing more surfers to surf the waves. In this configuration, transitional reefs, such as transitional reefs 92, 94, 96 and 98 extend outward to starboard from the stern of the master vessel 20. Additionally, transitional reefs 102, 104, 106 and 108 can extend to port. Moreover, both sets of transitional reefs may extend in both directions from the center reef. Transitional reefs 92, 94, 96, 98, 102, 104, 106 and 108 as shown here are constructed to mount flush to each other when connected, unlike the transitional reefs shown in FIG. 9, and previously described.

With respect to the above description it is to be realized that the optimum dimensional relationships for the parts of the invention, including variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the present invention.

The above description, together with the objects of the invention and the various features of novelty which characterize the invention, are pointed out with particularity in the claims annexed to and forming a part of this disclosure. For a better understanding of the invention, its operating advantages and the specific advantages attained by its uses, reference should be made to the accompanying drawings and descriptive matter in which there are illustrated preferred embodiments of the invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

I claim:

1. A floating and semi-submersible reef for capturing and controlling ocean wave energy to create surfing waves comprising:
   a) a deck portion, said deck portion containing a substantially flat top surface extending vertically downward in a convex shape, and a substantially flat bottom surface;
   b) a tri-hull shaped portion coupled to said bottom surface, said tri-hull shaped portion containing a two side portions and a vertically concave shaped center portion; and
   c) at least one controlling arm coupled to said tri-hull shaped portion for the purpose of attachment of the floating and semi-submersible reef to a towing vessel whereby when the floating and semi-submersible reef is positioned in ocean water, naturally occurring ocean currents contacting said top surface of the floating and semi-submersible reef form waves with varying characteristics as determined by the positioning of the floating and semi-submersible reef within the ocean water.

2. The floating and semi-submersible reef for capturing and controlling ocean wave energy to create surfing waves of claim 1, wherein said top surface is positioned between 3 and 20 feet below the ocean surface with the outer-most forward edge of bottom portion positioned at a depth of approximately 120 feet below ocean surface, thereby creating a bow angle to tangent at outer-most forward edge with the ocean surface that is about 40 to 80 degrees.

3. The floating and semi-submersible reef for capturing and controlling ocean wave energy to create surfing waves of claim 2, wherein said top surface is positioned between 3 and 20 feet below the ocean surface with the outer-most forward edge of bottom portion positioned at a depth of approximately 120 feet below ocean surface, thus creating a bow angle to tangent at outer-most forward edge with the ocean surface that is 70 degrees.

4. The floating and semi-submersible reef for capturing and controlling ocean wave energy to create surfing waves of claim 1, wherein said top surface contains surface variations for the purpose of focusing and optimizing smaller wave energy and assisting in producing waves with specific characteristics.

5. The floating and semi-submersible reef for capturing and controlling ocean wave energy to create surfing waves of claim 1, wherein said at least one controlling arm is comprised of three controlling arms.

6. The floating and semi-submersible reef for capturing and controlling ocean wave energy to create surfing waves of claim 1, wherein said at least one controlling arm contains ducting means for ballast pumps located on said towing vessel.

7. The floating and semi-submersible reef for capturing and controlling ocean wave energy to create surfing waves of claim 1, wherein said at least one controlling arm can be adjusted to vary the depth of the floating and semi-submersible reef within the ocean water.

8. The floating and semi-submersible reef for capturing and controlling ocean wave energy to create surfing waves of claim 1 further comprising a plurality of buoys coupled to the outer edge of said deck portion for the purpose of attaching protective nets.

9. The floating and semi-submersible reef for capturing and controlling ocean-wave energy to create surfing waves of claim 1, further containing a means for dissipating wave energy passing over said deck portion coupled to said deck portion.

10. The floating and semi-submersible reef for capturing and controlling ocean wave energy to create surfing waves of claim 1, further containing at least two wave dampening members retractably contained within said tri-hull shaped portion for the purpose of providing stability to the floating and semi-submersible reef.

11. A floating and semi-submersible reef for capturing and controlling ocean wave energy to create surfing waves comprising:
   a) a deck portion, said deck portion containing a substantially flat top surface. extending vertically downward in a convex shape, and a bottom surface;
   b) a tri-hull shaped portion coupled to said bottom surface, said tri-hull shaped portion containing a two side portions and a vertically concave shaped center portion;
   c) at least one controlling arm coupled to said tri-hull shaped portion for the purpose of attachment of the floating and semi-submersible reef to a towing vessel; and
   d) means for dissipating wave energy passing over said deck portion coupled to said deck portion
   whereby when the floating and semi-submersible reef is positioned in ocean water, fixed by said at least one controlling arm to said towing vessel, naturally occurring ocean currents contacting said top surface of the floating and semi-submersible reef form waves with varying characteristics as determined by the positioning of the floating and semi-submersible reef with in the ocean water.

12. The floating and semi-submersible reef for capturing and controlling ocean wave energy to create surfing waves of claim 11, wherein said top surface is positioned between 3 and 20 feet below the ocean surface with the outer-most forward edge of bottom portion positioned at a depth of approximately 120 feet below ocean surface, thereby creating a bow angle to tangent at outer-most forward edge with the ocean surface that is about 40 to 80 degrees.

13. The floating and semi-submersible reef for capturing and controlling ocean wave energy to create surfing waves of claim 12, wherein said top surface is positioned between 3 and 20 feet below the ocean surface with the outer-most forward edge of bottom portion positioned at a depth of approximately 120 feet below ocean surface, thus creating a bow angle to tangent at outer-most forward edge with the ocean surface that is 70 degrees.

14. The floating and semi-submersible reef for capturing and controlling ocean wave energy to create surfing waves of claim 11, wherein said top surface contains surface variations for the purpose of focusing and optimizing smaller wave energy and assisting in producing waves with specific characteristics.

15. The floating and semi-submersible reef for capturing and controlling ocean wave energy to create surfing waves of claim 11, wherein said at least one controlling arm is comprised of three controlling arms.

16. The floating and semi-submersible reef for capturing and controlling ocean wave energy to create surfing waves of claim 11, wherein said at least one controlling arm contains ducting means for ballast pumps located on said towing vessel.

17. The floating and semi-submersible reef for capturing and controlling ocean wave energy to create surfing waves of claim 11, wherein said at least one controlling arm can be adjusted to vary the depth of the floating and semi-submersible reef within the ocean water.

18. The floating and semi-submersible reef for capturing and controlling ocean wave energy to create surfing waves of claim 11 further comprising a plurality of buoys coupled to the outer edge of said deck portion for the purpose of attaching protective nets.

19. The floating and semi-submersible reef for capturing and controlling ocean wave energy to create surfing waves of claim 11, further containing at least two wave dampening members retractably contained within said tri-hull shaped portion for the purpose of providing stability to the floating and semi-submersible reef.

20. The floating and semi-submersible reef for capturing and controlling ocean wave energy to create surfing waves of claim 11, wherein said means for dissipating wave energy passing over said deck portion coupled to said deck portion is a slotted hollow cavity region.

* * * * *